(12) United States Patent
Travis

(10) Patent No.: US 7,410,286 B2
(45) Date of Patent: Aug. 12, 2008

(54) FLAT-PANEL DISPLAY USING TAPERED WAVEGUIDE

(75) Inventor: Adrian Robert Leigh Travis, Wrangaton (GB)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/485,888

(22) PCT Filed: Aug. 1, 2002

(86) PCT No.: PCT/GB02/03578

§ 371 (c)(1),
(2), (4) Date: Feb. 2, 2004

(87) PCT Pub. No.: WO03/013151

PCT Pub. Date: Feb. 13, 2003

(65) Prior Publication Data

US 2004/0196665 A1    Oct. 7, 2004

(30) Foreign Application Priority Data

Aug. 2, 2001   (GB) ................................ 0118866.3

(51) Int. Cl.
*F21V 7/04* (2006.01)
(52) U.S. Cl. ........................ 362/616; 362/623; 362/625; 362/626; 385/146; 385/116; 385/901

(58) Field of Classification Search .................. 362/625, 362/626, 612, 616, 623, 561; 385/146, 116, 385/901
See application file for complete search history.

(56) References Cited

U.S. PATENT DOCUMENTS

| 4,954,930 A | * | 9/1990 | Maegawa et al. | ............. 362/26 |
| 5,857,770 A | * | 1/1999 | Fohl et al. | ................... 362/511 |
| 6,222,971 B1 | * | 4/2001 | Veligdan et al. | ............. 385/120 |
| 6,883,919 B2 | * | 4/2005 | Travis | ......................... 353/81 |
| 2005/0007753 A1 | * | 1/2005 | Van Hees et al. | .............. 362/31 |

FOREIGN PATENT DOCUMENTS

| WO | WO 98/15128 | 4/1998 |
| WO | WO 00/04407 | 1/2000 |
| WO | WO 00/58932 | 10/2000 |
| WO | WO 01/72037 | 9/2001 |

\* cited by examiner

*Primary Examiner*—Jacob Choi

(57) ABSTRACT

A video display for two or three dimensions has a flat liquid-crystal screen which ejects light from the plane at a selectable line. One or, in the case of a 3-D display, several video projectors project a linear image into the plane from an edge. A complete image is written on the screen by addressing the line with appropriate images as it is scanned down the screen. To screen a three-dimensional image, the video projectors, each projecting an image as seen at a slightly different angle, combine to constitute a three-dimensional display which produces a three-dimensional image that is one line high.

11 Claims, 5 Drawing Sheets

```
%*********************************************
%               wegtrak3.m
%
% The wedge thickness versus ray angle formula is used to
% calculate the taper profile of a wedge which magnifies an
% image without dark bands.
%
% 24 April 2001,  Adrian Travis
%********************************************* t0=2.5;                                  %t0 is wedge's thickness &
z0=0;                                    %z0 its position at start.
crit=asin(1/1.5);                        %crit is the critical angle.
L=635;                                   %L is the slab half-length.

for b=1:283                              %For 283 double bounces, b,
   tc(b)=(t0/cos(crit))/sqrt(1+(2*L/(sqrt(5)*L-2*b*t0))^2);
end                                      %tc(b) is wedge thickness.

for b=1:283                              %cosray(b) is the cosine of
   cosray(b)=(sqrt(5)*L-2*b*t0)/sqrt((sqrt(5)*L-2*b*t0)^2+4*(L^2));
end                                      %ray input angle versus b.

tanray=sqrt(tc(1)^2/(t0^2*cosray(1)^2)-1);  %tanray is tan(rayangle).
z(1)=2*t0*tanray;                        %Ray moves z(1) if it enters
                                         %1 double bounce from crit.

tanray=sqrt(tc(1)^2/(t0^2*cosray(2)^2)-1);  %If ray is 2 dble bounces
sum=(z(1)-z0)/(2*tc(1)*tanray);          %from crit, sum counts dble
dz=2*tc(2)*tan(crit)*(2-sum);            %bounces up to z(1), get dz
z(2)=z(1)+dz;                            %from remainder,hence z(2).

for b=3:283                              %For 3 double bounces on..
   tanray=sqrt(tc(1)^2/(t0^2*cosray(b)^2)-1);  %Find 1st tanray and
   sum=(z(1)-z0)/(2*tc(1)*tanray);       %dble bounces in 1st leg.
   for i=1:b-2                           %Then for each next leg,
      tanray=sqrt(tc(i+1)^2/(t0^2*cosray(b)^2)-1);  %find tanray and
      sum=sum+(z(i+1)-z(i))/(2*tc(i+1)*tanray);     %add the double
   end                                   %bounces up to the last leg.
   dz=2*tc(b)*tan(crit)*(b-sum);         %Bounces remaining give dz,
   z(b)=z(b-1)+dz;                       %and hence z(b).
end plot(z,tc);
```

Figure 1

Figure 2
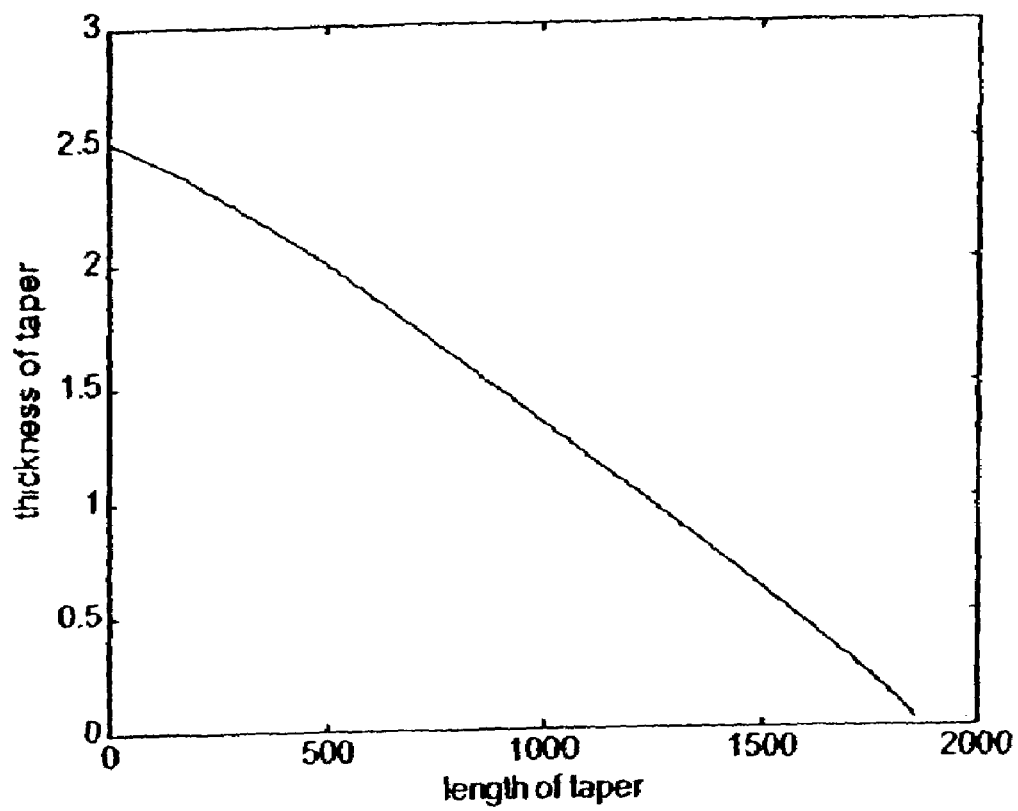
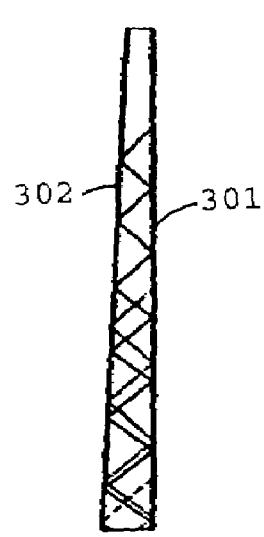
Fig 3a
Fig 3b

| t | z | t | z | t | z | t | z |
|---|---|---|---|---|---|---|---|
| 14.88454 | 0 | 13.59214 | 223.25 | 11.86021 | 483.83 | 9.609266 | 784.03 |
| 14.88294 | 0.3 | 13.56 | 228.36 | 11.81806 | 489.83 | 9.555135 | 790.98 |
| 14.85844 | 4.9 | 13.52768 | 233.46 | 11.77567 | 495.74 | 9.500736 | 797.93 |
| 14.8338 | 9.5 | 13.49517 | 238.67 | 11.73303 | 501.74 | 9.446069 | 804.87 |
| 14.80901 | 14.1 | 13.46246 | 243.78 | 11.69017 | 507.75 | 9.391133 | 811.82 |
| 14.78407 | 18.7 | 13.42956 | 248.99 | 11.64706 | 513.75 | 9.33593 | 818.76 |
| 14.75899 | 23.35 | 13.39647 | 254.09 | 11.60371 | 519.76 | 9.280458 | 825.81 |
| 14.73376 | 28.11 | 13.36319 | 259.3 | 11.56011 | 525.86 | 9.224717 | 832.86 |
| 14.70838 | 32.76 | 13.3297 | 264.63 | 11.51628 | 531.87 | 9.168707 | 839.8 |
| 14.68285 | 37.42 | 13.29603 | 269.96 | 11.4722 | 537.81 | 9.112428 | 846.95 |
| 14.65717 | 42.17 | 13.26215 | 275.28 | 11.42788 | 543.93 | 9.055881 | 854 |
| 14.63134 | 46.93 | 13.22807 | 280.71 | 11.38331 | 550.04 | 8.999064 | 861.15 |
| 14.60535 | 51.68 | 13.1938 | 286.04 | 11.3385 | 556.16 | 8.941979 | 868.3 |
| 14.57922 | 56.33 | 13.15932 | 291.47 | 11.29344 | 562.38 | 8.884624 | 875.45 |
| 14.55292 | 61.09 | 13.12465 | 296.9 | 11.24813 | 568.6 | 8.827 | 882.6 |
| 14.52647 | 65.84 | 13.08977 | 302.33 | 11.20257 | 574.71 | 8.769108 | 889.75 |
| 14.49987 | 70.7 | 13.05468 | 307.76 | 11.15676 | 581.03 | 8.710946 | 897 |
| 14.4731 | 75.45 | 13.01939 | 313.19 | 11.11071 | 587.25 | 8.652516 | 904.26 |
| 14.44618 | 80.21 | 12.98389 | 318.62 | 11.0644 | 593.47 | 8.593818 | 911.52 |
| 14.4191 | 85.07 | 12.94819 | 324.16 | 11.01784 | 599.79 | 8.534851 | 918.78 |
| 14.39186 | 89.92 | 12.91228 | 329.69 | 10.97103 | 606.11 | 8.475616 | 926.14 |
| 14.36446 | 94.68 | 12.87616 | 335.22 | 10.92396 | 612.43 | 8.416113 | 933.5 |
| 14.33689 | 99.53 | 12.83983 | 340.75 | 10.87664 | 618.75 | 8.356342 | 940.76 |
| 14.30916 | 104.39 | 12.80329 | 346.29 | 10.82907 | 625.17 | 8.296304 | 948.23 |
| 14.28127 | 109.24 | 12.76653 | 351.82 | 10.78124 | 631.49 | 8.235999 | 955.59 |
| 14.25321 | 114.1 | 12.72956 | 357.35 | 10.73315 | 637.92 | 8.175427 | 963.06 |
| 14.22499 | 119 | 12.69238 | 362.99 | 10.68481 | 644.34 | 8.114589 | 970.42 |
| 14.1966 | 123.81 | 12.65498 | 368.62 | 10.63621 | 650.76 | 8.053486 | 977.89 |
| 14.16804 | 128.71 | 12.61737 | 374.26 | 10.58735 | 657.29 | 7.992117 | 985.46 |
| 14.13931 | 133.52 | 12.57954 | 379.89 | 10.53824 | 663.71 | 7.930483 | 992.92 |
| 14.11041 | 138.43 | 12.54148 | 385.53 | 10.48886 | 670.24 | 7.868585 | 1000.49 |
| 14.08134 | 143.33 | 12.50321 | 391.26 | 10.43923 | 676.76 | 7.806423 | 1007.96 |
| 14.0521 | 148.24 | 12.46472 | 396.9 | 10.38933 | 683.39 | 7.743998 | 1015.52 |
| 14.02269 | 153.15 | 12.42601 | 402.6 | 10.33917 | 689.92 | 7.68131 | 1022.97 |
| 13.9931 | 158.06 | 12.38708 | 408.3 | 10.28875 | 696.54 | 7.61836 | 1030.5 |
| 13.96333 | 162.96 | 12.34792 | 414 | 10.23807 | 703.07 | 7.555149 | 1038.12 |
| 13.93339 | 167.97 | 12.30853 | 419.7 | 10.18713 | 709.7 | 7.491678 | 1045.75 |
| 13.90328 | 172.88 | 12.26893 | 425.5 | 10.13592 | 716.43 | 7.427947 | 1053.38 |
| 13.87298 | 177.88 | 12.22909 | 431.2 | 10.08445 | 723.06 | 7.363957 | 1061 |
| 13.84251 | 182.89 | 12.18903 | 437 | 10.03271 | 729.79 | 7.299708 | 1068.73 |
| 13.81185 | 187.9 | 12.14874 | 442.81 | 9.98071 | 736.52 | 7.235203 | 1076.36 |
| 13.78102 | 192.91 | 12.10821 | 448.61 | 9.928446 | 743.25 | 7.170441 | 1084.09 |
| 13.75 | 197.91 | 12.06746 | 454.41 | 9.875915 | 749.98 | 7.105424 | 1091.82 |
| 13.7188 | 203.02 | 12.02648 | 460.31 | 9.823118 | 756.71 | 7.040153 | 1099.65 |
| 13.68741 | 208.03 | 11.98526 | 466.12 | 9.770056 | 763.54 | 6.974628 | 1107.38 |
| 13.65584 | 213.13 | 11.94381 | 472.02 | 9.716726 | 770.37 | 6.90885 | 1115.21 |
| 13.62408 | 218.14 | 11.90213 | 477.92 | 9.66313 | 777.2 | 6.842822 | 1123.04 |
|  |  |  |  |  |  | 6.776543 | 1130.87 |

Figure 4

FLAT-PANEL DISPLAY USING TAPERED WAVEGUIDE

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

This invention is concerned with a way of eliminating distortion in a tapered-waveguide display of the kind in which light enters the blunt end of a tapered slab waveguide.

2. General Background of the Invention

Such a tapered-waveguide display comprises a video projector, a flat slab waveguide, known as an "input" or "expansion" waveguide, for spreading light from the projector in the width direction, and a tapered sheet of transparent material acting as a leaking waveguide, light exiting from its face at a point determined by the angle at which it entered. The taper starts at the same thickness as the expansion waveguide and decreases usually to zero. Light entering the taper at some angle up to the critical angle bounces ever more steeply until it exits at a distance along the taper that depends on the initial angle of injection. The system is described in the applicant's earlier application WO 01/72037.

These displays are cheap and robust because the screens need no thin-film transistors and can be made of plastic, but the projected image can be prone to distortion. In particular, the image may separate into bands with dark gaps in between, because there are certain points on the tapered exit waveguide that cannot be reached at the critical angle by any ray entering the taper. Thus between the $n^{th}$ bounce and the $(n+1)^{th}$ no light emerges. It is desirable to address this problem.

BRIEF SUMMARY OF THE INVENTION

According to the present invention there is provided a tapered-waveguide display apparatus including an input waveguide in the form of a slab, into one end of which light can be injected so that it bounces along the waveguide and exits at the other end, and a tapered output waveguide adapted to receive light from the input waveguide at the thick end of the taper to allow it to propagate a certain distance by reflection within the taper and then to emit the light over one of the faces of the tapered waveguide when the angle within the taper exceeds the critical angle; in which the tapered waveguide's thickness profile is such that light bounces the same number of times in total, passing through the two waveguides, before leaving the tapered waveguide.

In the earlier application the wedge shape of the tapered waveguide had planar faces, which meant that there could be gaps where light bouncing to and fro as it was internally reflected along the input slab and then the tapered slab stayed within the taper for one more bounce before reaching the critical angle. It has been found that a very slight deviation from the flat in the faces of the tapered waveguide can compensate for this effect, by making sure that the number of bounces is always the same. This is possible because there is already an inbuilt tendency balancing out the number of bounces: rays entering at a shallow angle will bounce less often in the input slab but will stay longer in the output slab, and vice versa.

The shape of the tapered slab can be calculated by ray tracing, and this calculation is particularly simple if the input or expansion slab, which is used to spread the image in one dimension, in the plane of the slab, is a (flat) cuboid. The input slab can be integral with or separate from the taper; and it can be in the same plane or "folded" by optical means. Usually the input and output waveguides have about the same shape in plan, so folding halves the footprint of the device.

Although the device is described more in terms of a display it could equally be run backwards as a camera, as described in the applicant's earlier PCT/GB 01/5266. If the light source is a simple point source then the apparatus becomes simply a light source, useful for LCD or hologram illumination.

BRIEF DESCRIPTION OF THE SEVERAL VIEWS OF THE DRAWINGS

For a better understanding of the invention embodiments of it will now be described, by way of example, with reference to the accompanying drawings, in which:

FIG. 1 contains an example algorithm for calculating an appropriate thickness profile for the tapered waveguide;

FIG. 2 plots the profile of the tapered waveguide calculated by the algorithm of FIG. 1;

FIG. 3 traces rays through the tapered waveguide, with FIG. 3a showing the situation after each ray has undergone 574 bounces, and FIG. 3b showing the situation after each ray has undergone 575 bounces;

FIG. 4 gives the thickness (t) versus length (z) co-ordinates of an embodiment of the shaped taper;

DETAILED DESCRIPTION OF THE INVENTION

Figure 7:
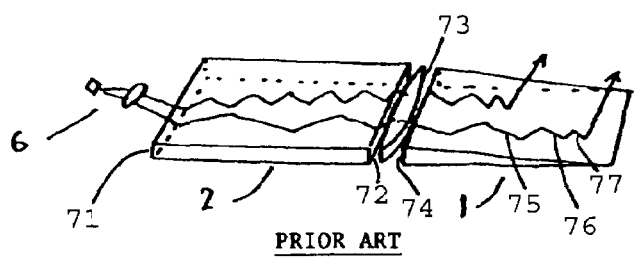
FIG. 7 shows the display apparatus schematically.
Figure 8:
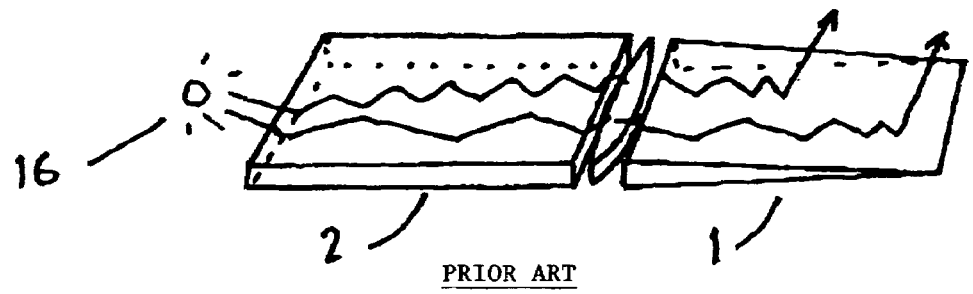
FIG. 8 illustrates the display apparatus in FIG. 7 showing point light source 16.

FIG. 7 shows the general layout contemplated by the invention. A projector 6 (or camera if the apparatus is operated backwards, or just a point light source for producing area illumination) emits (or receives) light forming an image made of an array of pixels into an edge 71 of a rectangular slab waveguide 2 where it propagates by reflection alternately off the main faces. This slab will usually have flat parallel faces, though this is not necessary. As the light propagates it spreads laterally, in the plane of the slab and perpendicular to the direction of propagation, by the far end 72 reaching the entire width of the slab. Thus the image is as it were magnified in the width direction. There it is collimated by a cylindrical lens 73 to enter the blunt end 74 of a slab waveguide 1 of equal width but tapering in height in the direction away from the projector. Here it is also internally reflected, but at ever increasing (steeper) angles 75-77 until at the critical angle given by Snell's Law it escapes, for instance to form a display. The principle is described in WO 01/72037. FIG. 8 is a re-illustration of FIG. 7, but including the point light source labelled as 16.

The shaped taper is made by using an algorithm to calculate for the taper a series of thicknesses and distances between these thicknesses, then passing these data to a numerically controlled machine which either shapes the tapered waveguide directly, or shapes a mould for making it. Other methods of manufacture can also be contemplated.

The algorithm starts by considering a ray whose angle is equal to the critical angle for total internal reflection off the faces of the slab and taper at the slab/taper boundary. This ray will have bounced the maximum possible number of times as it traveled along the input slab and will leave the tapered waveguide at the first bounce. The algorithm determines what change in ray angle is needed for a ray to undergo one double bounce less in the input slab, then calculates at what taper thickness this ray will emerge from the taper. The algorithm then calculates what distance is needed from the taper entrance (i.e. the thick end) to the point at which the ray emerges in order for the ray to undergo one extra double bounce in the tapered waveguide, thus keeping the total number of bounces constant, and allocates this extension of the taper to the new value for the taper's thickness. This procedure is repeated for successive ray angles until the thickness of the taper has decreased to zero.

The change in ray angle needed for a ray to undergo one double bounce less in the input slab is found by calculating the progress of trial rays through the slab—a procedure known as ray tracing. In the embodiment here described the input or expansion slab has parallel faces, and the ray angle $\theta_{in}$ is given by trigonometry as:

$$\cos\theta_{in} = \frac{\frac{2L}{\tan\theta_c} - 2bt_{in}}{\sqrt{\frac{2L}{\tan\theta_c} - 2bt_{in} + 4L^2}}$$

where b is the number of bounces less than those for a ray at the critical angle, $t_{in}$ is the thickness of the expansion slab and of the input to the taper, 2 L is the length of the expansion slab, and $\theta_c$ is the critical angle. It is here assumed that the slabs are made of glass, but any suitable material could be used.

The taper thickness, $t_c$, at which a ray will emerge from the taper is calculated from the angle of the ray, $\theta_{in}$, relative to the normal to the glass/air interface as the ray passes into the taper, as follows:

$$\Delta\theta = 2\frac{dt}{dz}$$

$$\Delta z = \frac{2}{t\tan\theta}$$

$$\frac{d\theta}{dz} = \frac{1}{t\tan\theta}\frac{dt}{dz}$$

$$\tan\theta\frac{d\theta}{dz} = \frac{1}{t}\frac{dt}{dz}$$

$$\frac{d}{dz}(-\ln\cos\theta) = \frac{d}{dz}\ln t$$

$$t_c = \frac{t_{in}\cos\theta_{in}}{\cos\theta_c}$$

The distance, from the taper entrance to the point at which the ray emerges, needed in order for the ray to undergo one extra double bounce is found by tracing a ray through the taper at $\theta_{in}$. The distance moved by the ray during any double bounce can be shown by trigonometry to be twice the thickness of the wedge, t, at that point times the tangent of ray angle $\theta$ at that point. The tangent of ray angle is related to thickness as follows:

$$\tan\theta = \frac{\sqrt{1-\cos^2\theta}}{\cos\theta}$$

$$= \sqrt{\frac{1}{\cos^2\theta} - 1}$$

$$= \sqrt{\frac{t^2}{t_{in}^2\cos^2\theta_{in} - 1}}$$

For the embodiment described here, an algorithm was written for Matlab Version 4.2c.1 from The Mathworks, Inc., and is shown in FIG. 1. Note that $\tan\theta_c$ here appears as $\sqrt{5}/2$ which is what it equals when the refractive index equals 1.5 as it does in the example given.

The profile of the taper for this embodiment is shown in FIG. 2, and was calculated using the algorithm of FIG. 1 with the single change that in the third line of executable code, crit is set equal to the inverse sine of 1/1.491756 (i.e. the critical angle of light in acrylic). Two traces of three sample rays through a 1270 mm long, initially 2.5 mm thick slab, then a taper with the profile shown in FIG. 2, are shown in FIG. 3, which shows progress along the taper on the vertical axis against propagation perpendicular to the plane, on the horizontal axis. In FIG. 3a, the rays have been traced through 574 bounces and none have emerged from the taper. In FIG. 3b the rays have been traced with one extra bounce, and all have emerged from the taper whether those near the beginning or those near the end of the taper. The input ray angle can therefore be varied without causing any change in the number of bounces, so no dark gap arises at any point.

The code is slightly crude, so the shape of the taper should then be adjusted by trial and error using a ray-tracing program such a Zemax to get a profile where all rays leave the taper at approximately the same emergent angle after the same number of bounces. This is done by tracing a ray such as to emerge near to the thick end of the wedge, then tracing rays at gradually decreasing angles of injection. If a ray emerges at too shallow an angle or with too many bounces, the section of taper between the position of emergence of the current ray and that of the previously traced ray should be reduced. If a ray emerges at too large an angle or with too few bounces, the section of taper between the position of emergence of the current ray and that of the previously traced ray should be increased.

It appears that, within limits, the precise shape of the taper is not important—it is the thickness along its length that matters. One face 301 could be flat, or both faces 301, 302 could undulate, or whatever.

Figure 5:
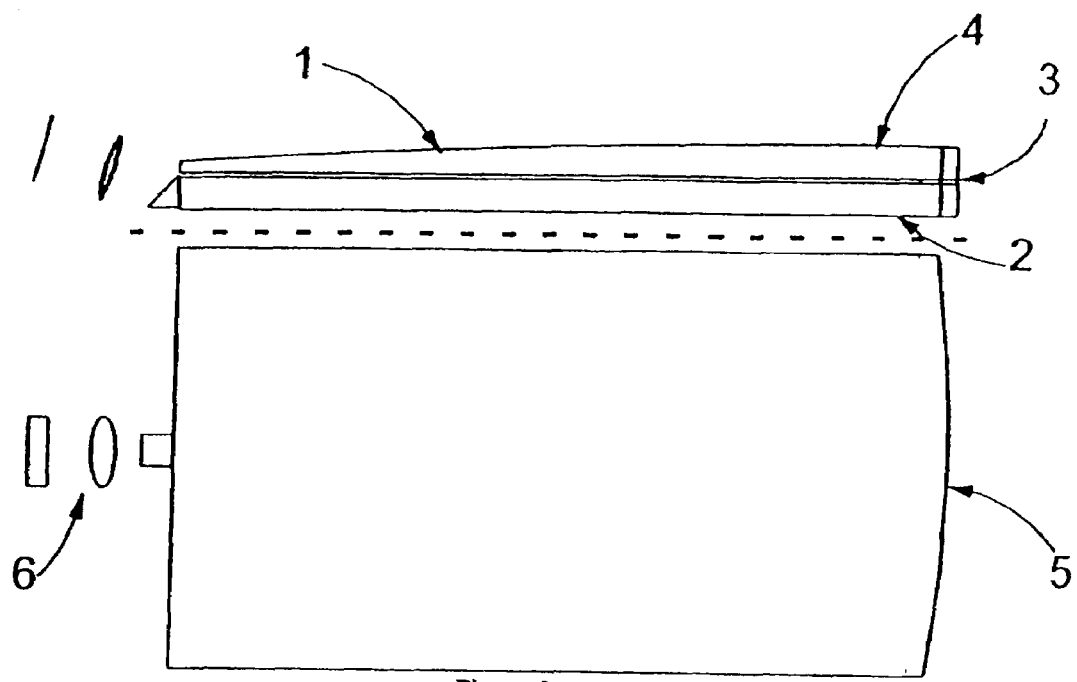
FIG. 5 shows how the slab and taper should be folded with a bulk mirror collimator at the short edge of the slab.

FIG. 4 shows the thickness and length co-ordinates of a taper embodying this invention which in this case is 15 mm thick at the thick end, is approximately 1130 mm long, and is butted to a slab which is 1270 mm long and 15 mm thick. FIG. 5 shows, in elevation and plan, the taper 1 and expansion slab 2 together, with a fold 3 in the slab 2 and, in order to merge the transition from the slab 2 to the shaped taper 1, a 44 mm section either side of the slab/taper interface which is smoothed to a curve 4 with a radius of curvature of 8500 mm.

If a thicker taper is required, the thickness of both slab and taper should be scaled linearly. If a longer taper is required, the length of both slab and taper should be scaled linearly.

Figure 9:
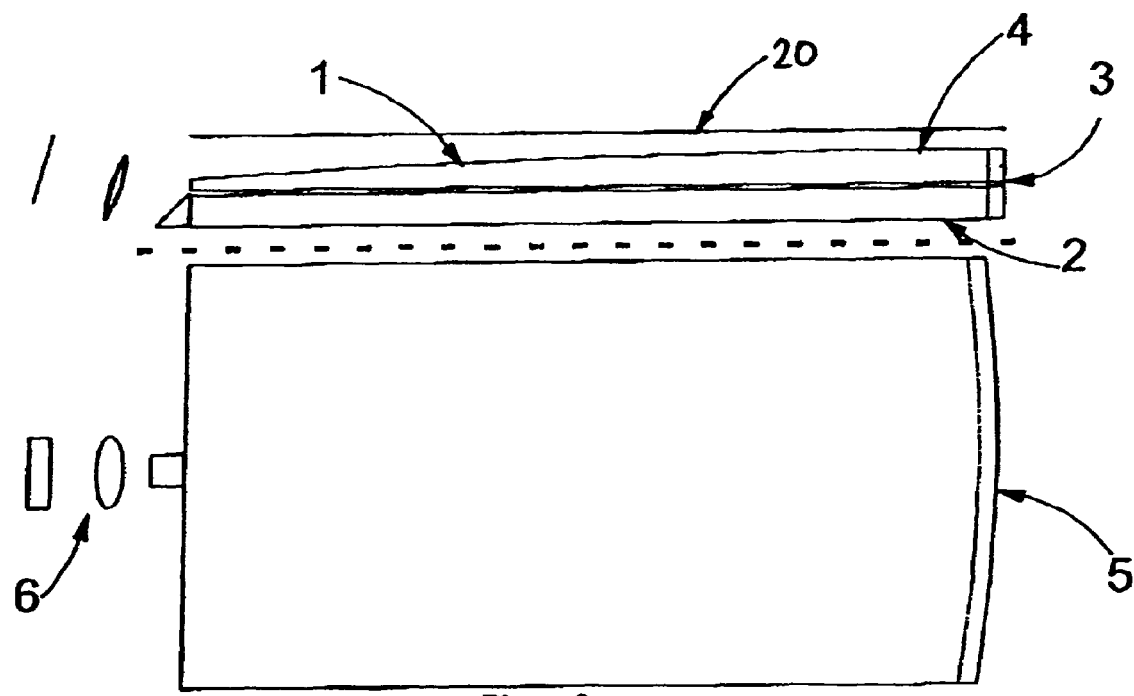
FIG. 9 illustrates the slab and tapered portion of the apparatus as illustrated in FIG. 5 including screen 20.

If gaps are to be avoided at all angles of projection, then it is important that the optical path length from projector to wedge is not altered when the rays are collimated between slab and taper. A Fresnel mirror is therefore unsuitable, but the effect of a conventional collimating mirror will be to make the edge of the display curved. In order to minimise this curve, rays are projected parallel to the longer dimension of the display (assuming it is generally rectangular) onto a mirror 5 at the shorter side, as shown in FIG. 5. The aspect ratio of the waveguides will generally be less than 2, at least for a display. Not shown in FIG. 5 is a fold within the slab which should be introduced if it is desired to place the video projector 6 at the centre of one of the longer sides of the display, and a translucent screen on top of the tapered waveguide to make the image visible in various directions. Translucent screen on the top of the tapered waveguide is illustrated in FIG. 9, by numeral 20.

When rays reach an incident angle just less than the critical angle they will only be partially transmitted, and the unwanted reflected ray component will emerge further along the waveguide in such a way as to blur adjacent pixels. However, the reflected component emerges at a steeper angle than the first, and one way to avoid blurring is to space the translucent screen at such a distance from the waveguide that both ray components coincide as they hit the screen. The disadvantage of this is that it makes the whole display even thicker, and the modified displays of this invention are required in any case to be thicker than normal in order to preserve étendue.

Figure 6:
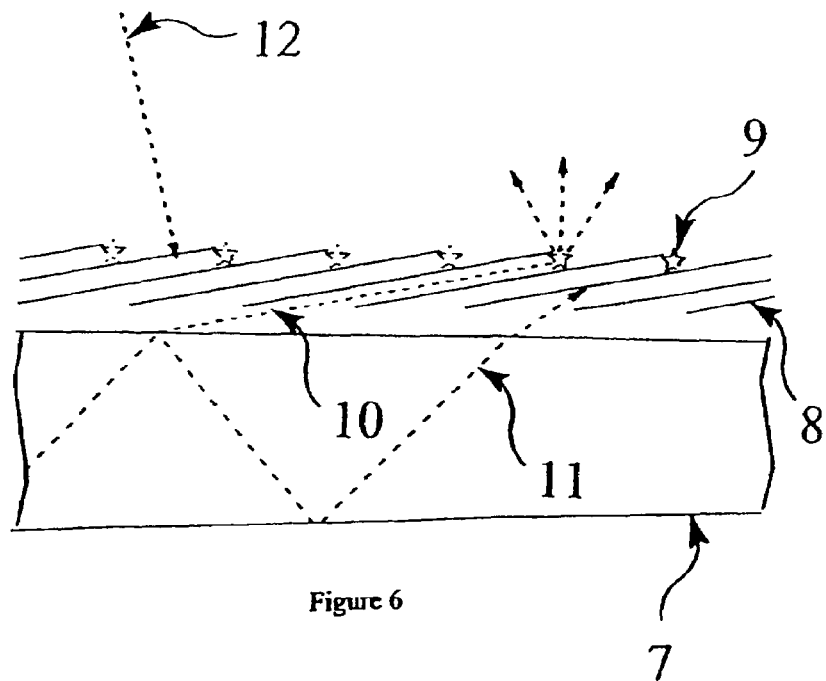
FIG. 6 shows how a set of louvers and fine scattering sites can be used to reduce blurring and improve contrast ratio.

Preferably, therefore, a set of opaque louvers 8 is placed over the tapered waveguide 7 as shown in FIG. 6, so as to pass that component of rays 10 transmitted when the ray is first incident at less than the critical angle, but to block the reflected ray component 11. A scattering element 9 such as a phosphor or refractive surface should be placed at the end of each louver, and provided the scattering elements are kept small then most ambient light 12 will be absorbed by the louvers. Alternatively the elements 9 can be emissive, such as a phosphor activated by short-wavelength, possibly UV, input light. The result is a thin screen which has no blurring and a good contrast ratio but needs no anti-reflection coating.

The invention claimed is:

1. A tapered-waveguide optical apparatus including:
   an input waveguide in the form of a slab, the input waveguide comprising a first input end for injection of light such that it bounces along the input waveguide and travels to a first output end; and
   an output waveguide having two opposed main faces and a second input end for receiving light at various angles of incidence from the input waveguide,
   wherein the output waveguide is arranged to allow light to propagate a certain distance by reflection within the output waveguide at successively steeper angles of incidence on said opposed main faces and then to emit the light over one of the faces of the output waveguide when the angle of incidence at that one face exceeds the critical angle for total internal reflection;
   in which the output waveguide's thickness profile is such that the light of different angles of incidence at said second input end bounces the same number of times in total, on passing through the two waveguides, before leaving the output waveguide.

2. An optical apparatus according to claim 1, in which the input waveguide is a flat rectangular cuboid.

3. An optical apparatus according to claim 1, in which the two waveguides are made of the same material.

4. An optical apparatus according to claim 1, further including a collimating element directing the light between the input waveguide and the output waveguide so that, resolved in the plane of the output waveguide, the light travels substantially parallel.

5. An optical apparatus according to claim 1, further including a screen over the output waveguide for spreading the emerging light to increase the viewing angle.

6. An optical apparatus according to claim 5, in which the screen comprises louvers inclined at an angle suitable for passing the emerging rays, and diffusing elements between the louvers.

7. An optical apparatus according to claim 1 and including a video projector arranged to inject an image into the input waveguide, so as to form a display.

8. An optical apparatus according to claim 1 and including an effective point source of light, the apparatus thus acting as a planar light source.

9. An optical apparatus according to claim 1, in which the input and output waveguides are folded so that one lies over the other.

10. A method of manufacturing a tapered-waveguide optical apparatus, the optical apparatus comprising an input waveguide in the form of a slab, the input waveguide comprising an input end for injection of light such that the light bounces along the input waveguide and travels to a first output end; and an output waveguide having two opposed main faces and a second input end for receiving light at various angles of incidence from the input waveguide, wherein the output waveguide is arranged to allow light to propagate a certain distance by reflection within the output waveguide at successively steeper angles of incidence on said opposed main faces and then to emit the light over a face when the angle of incidence at that face exceeds the critical angle for total internal reflection; in which the method comprises the follow steps:
   starting with the maximum number of bounces within the input waveguide, calculating the thickness of the output waveguide for each decrement of one double bounce in the input waveguide;
   calculating the corresponding distance from the thick end of the taper to ensure that the light undergoes one extra double bounce in the output waveguide, thus ensuring that the total number of bounces is kept constant;
   repeating the calculations of the thickness and distance from the thick end of the output waveguide for each decrement of one double bounce in the input waveguide until the thickness reaches a lower limit and the output waveguide, or a mould for it, is shaped accordingly.

11. A tapered-waveguide optical apparatus including:
   an input waveguide in the form of a slab, into a first input end of which light is injectable so that light bounces along the waveguide and exits at a first output end; and
   an output waveguide having two opposed main faces and a second input end for receiving light at various angles of incidence from the input waveguide and arranged to allow light to propagate a certain distance by reflection within the output waveguide at successively steeper angles of incidence on said opposed main faces and then to emit the light over one of the faces of the output waveguide when the angle of incidence at that face exceeds the critical angle; in which the output waveguide's thickness profile is such that light bounces the same number of times in total on passing through the two waveguides, before leaving the output waveguide, further including:

a collimating element directing the light between the input waveguide and the output waveguide so that, resolved in the plane of the output waveguide, the light travels substantially parallel; and a screen over the output waveguide for spreading the emerging light to increase the viewing angle, in which the input and output waveguides are folded so that one lies over the other.

* * * * *

UNITED STATES PATENT AND TRADEMARK OFFICE
CERTIFICATE OF CORRECTION

| | | |
|---|---|---|
| PATENT NO. | : 7,410,286 B2 | Page 1 of 1 |
| APPLICATION NO. | : 10/485888 | |
| DATED | : August 12, 2008 | |
| INVENTOR(S) | : Adrian Robert Leigh Travis | |

It is certified that error appears in the above-identified patent and that said Letters Patent is hereby corrected as shown below:

IN THE SPECIFICATIONS:

In column 2, line 43, delete "schematically." and insert -- schematically; --, therefor.

Signed and Sealed this

Nineteenth Day of April, 2011

David J. Kappos
*Director of the United States Patent and Trademark Office*